Patented Sept. 8, 1942

2,295,129

UNITED STATES PATENT OFFICE 2,295,129

PROCESS OF PREPARING VITAMIN K CONCENTRATES

Byron Riegel and Perrin G. Smith, Evanston, Ill., Carl E. Schweitzer, Flint, Mich., and Vernon C. Free, North Chicago, Ill., assignors to Abbott Laboratories, North Chicago, Ill., a corporation of Illinois No Drawing. Application December 22, 1939, Serial No. 310,542

7 Claims. (Cl. 167—81)

The present invention relates to vitamin K concentrates, and more particularly to an improved method for producing concentrates of vitamin K, the so-called "anti-hemorrhagic" or "coagulation" vitamin.

An inadequate intake of vitamin K with foods or defective absorption of this vitamin in the intestinal tract (due, for example, to absence or deficiency of bile), causes a material increase in the coagulation time of blood. This in turn is apparently due to depletion of prothrombin, one of the constituents in blood essential for normal clotting.

It is the principal object of this invention to provide an improved process for obtaining vitamin K concentrates.

It is also an object of this invention to provide a vitamin K concentrate the efficiency of which is so great that a few milligrams to a few hundred milligrams (administered, for example, with or without bile salts orally or injected intramuscularly, etc.) will maintain the normal coagulation time of blood.

It is a further object of this invention to provide a vitamin K concentrate which will bring the coagulation time of blood back to normal and stop bleeding in patients suffering from disorders conducive to low prothrombin content, such as hemorrhagic diathesis of jaundice or biliary tract injuries, as well as in certain conditions or diseases where there is interference with intestinal absorption of vitamin K.

Vitamin K is known to be present in many natural substances, particularly in the green leaf portion of various plants such as alfalfa, young cereals, spinach and the like. An extraction of these vegetable materials with any of the well known solvents, for example,—acetone, methyl alcohol, ethyl ether, benzol, etc. yields an extract containing the desired vitamin K, together with relatively large amounts of unwanted materials, including the chlorophylls and other pigments, as well as other compounds such as the porphyrins, carotenoids and phytosterols. Various processes have been suggested for separating the inactive (unwanted) materials from the vitamin, but most of these have been found to possess serious disadvantages and to be relatively unsatisfactory for use in the commercial production of vitamin K concentrates.

Attempts have been made, for example, to employ adsorbent materials such as magnesium oxide, calcium sulfate, talcum, aluminum oxide and calcium carbonate, in an effort to fractionally adsorb the plant matter and leave the desired vitamin K behind in the extract. All of the above mentioned adsorbents, however, have been found to be unsatisfactory, for while they serve to remove a large portion of inert material including pigments, from the solvent extract, they simultaneously remove a considerable portion of the vitamin K as well, causing a partial or complete deactivation of the extract. Tests carried out using commercially practical recovery processes have shown the retention of the vitamin K by the suggested adsorbates to be such that at best only a portion of the vitamin can be recovered from them.

After a prolonged research investigation we discovered that the silicates, particularly the silicate compounds selected from the group consisting of magnesium tri-silicate, acidic (including very weakly acidic) fuller's earth and powdered silica gel, possessed the unique and unexpected property of selectively adsorbing chlorophylls and other pigments from an extract containing vitamin K without removing any (or at the most only insignificant amounts) of vitamin K. We also discovered that the silicates could be used to remove large portions of sterols, porphyrins and carotenoids from decolorized extracts or from molecular distillates obtained therefrom without removing any (or at the most insignificant amounts) of vitamin K. We further discovered that the silicates could be used to remove vitamin K activity from concentrates including purified concentrates and that the desired vitamin activity could be eluted and readily recovered therefrom substantially free from contamination by sterols and other inert solids.

The following preferred example will illustrate our new process:

Example I

The green leaf portion of various plants known to contain vitamin K, preferably alfalfa or young cereal plants, are first carefully dried and ground. About fifteen hundred grams of this dry material is then macerated or percolated with about three liters of a suitable solvent, preferably hexane, the percolation being continued until most of the green pigments have been extracted. To this dilute extract is next added magnesium trisilicate at the rate of approximately eight per cent by weight of the dry vegetable, and the mixture stirred until the supernatant liquid is of a clear, light yellow color. The mixture is then decanted and the silicate completely removed by filtration. A second extract is then formed by washing the spent silicate once or twice with an organic solvent such as hexane. The two extracts are then combined and distilled in vacuo in the usual manner in order to remove the solvents.

The quantity of magnesium trisilicate used in the above illustrative example may vary according to the amount of pigment in the vegetable material. The optimum amounts of silicate may be readily determined by preliminary laboratory experiment.

In place of the hexane solvent of the above example other hydrocarbon solvents such as petroleum ether, iso-pentane, gasoline, etc. may be employed. In addition other solvents such as methyl alcohol, ethyl alcohol, acetone, ethyl ether, benzol, etc. may be employed, although the use of an aliphatic hydrocarbon solvent with the silicate is preferred as the removal of the green pigment is more readily effected in this type of solvent. If the other type of solvents e. g. alcohol, acetone, etc., are used initially, they may be removed in vacuo and the green residue subsequently taken up in a hydrocarbon solvent (preferably hexane) for treatment with the adsorbent.

Dried alfalfa meal treated in accordance with the above example yields a decolorized concentrate appearing as a dark reddish, yellow viscous oil containing substantially all of the vitamin K activity contained in the original vegetable material. This oil may be further purified by dissolving it in a fresh portion of organic solvent, preferably hexane, in the proportion of one liter of solvent for each ten grams of oil, and treating with additional silicate, e. g. magnesium trisilicate in amounts of approximately 5 per cent by weight of the original dry vegetable material. This treatment removes a large portion of the yellowish and reddish prophyrins and carotenoids as well as the sterols without removing the vitamin K activity. After removal of the organic solvent, a concentrate is obtained which is 2-3 times the vitamin K potency of the original reddish, yellow oil.

The organic solvent extracts, whether crude or partly decolorized and purified, may be further concentrated by setting them aside, first at room temperature or in the refrigerator and later at zero degrees centigrade or below. This treatment precipitates additional portions of sterols which may be readily separated by filtration.

The following additional example will serve to illustrate the present invention.

*Example II*

A crude extract of vegetable material is first prepared with a suitable solvent (preferably a hydrocarbon such as hexane) in accordance with the general practice outlined above. To this extract is added fuller's earth (e. g. "Florex,"—a Florida fuller's earth) at the rate of approximately 22 per cent by weight of the dry vegetable material, and the resulting mixture stirred until the supernatant liquid is a light, yellowish color. The solvent-free concentrate obtained in accordance with the previously described example contains substantially all of the vitamin K contained in the original vegetable material.

The product obtained by the above treatment may be further purified by dissolving 40 grams of the oil concentrate in 500 c. c. of benzol and treating with about 180 grams of activated "Florex" i. e. "Florex" heated to 250° C. for approximately one hour and cooled. This additional treatment removes a large part of the reddish-yellow pigments and other impurities and upon filtration and removal of the solvent, yields about 30 grams of an orange-red oil containing substantially all of the vitamin K activity originally present in the vegetable material. This latter step is accompanied by a reduction in volume and an increase in potency.

The amount of fuller's earth used in the above example may also vary according to the quantity of pigment in the vegetable material. The optimum amounts of fuller's earth or dry silica gel, which gives similar results, may be determined by preliminary laboratory experiment.

Regardless of which type of silicate adsorbent is employed, we have found that a further concentration may be effected by dissolving the active, decolorized oil in acetone, approximately one-fourth by volume of the weight of the dry vegetable material used, and setting the solution aside at 0° C. for a period of about 24 hours. The precipitate formed by this treatment has no vitamin K activity and may be removed by filtration at 0° C. The acetone may be removed from the filtrate in vacuo in the usual manner.

Our investigations show that the silicate adsorbents remove sterols from purified, decolorized concentrates or molecular distillates obtained therefrom more effectively than freezing alone. In view of this, in our preferred process we ordinarily combine the two methods and remove sterols by subjecting the partially purified or decolorized concentrates to both freezing and additional silicate treatments. As an example, a decolorized concentrate (molecularly distilled at a pressure of $10^{-3}$ mm.) is subjected to several freezing treatments in acetone solution and subjected to several fuller's earth treatments in petroleum ether solution. About 20 to 22 per cent of solids based on the original weight of the distillate and consisting largely of phytosterols may be removed in this manner.

The silicate treatment may be carried out at room temperature or the mixture may be heated to boiling under reflux, or the initial stirring with the silicate may be done at room temperature and the subsequent washings carried out by boiling under reflux. The silicate treatment may also be carried out by passing the extract through a column of the adsorbent according to the usual practice in chromatographic adsorption. Bioassays of various type extracts for vitamin K before and after removal of the pigments, etc. show that substantially no vitamin K activity is lost by the silicate treatment.

The silicate adsorbents may also be employed for removal by adsorption of vitamin K activity from concentrates. For example, vitamin K activity may be adsorbed from a solution of 5 grams of distillate (preferably virtually sterol-free and containing for example about 25,000 Peirce Dann units of vitamin K per gram) in 200 c. c. of petroleum ether with about 40 grams of fuller's earth, i. e. activated "florex." The adsorbed vitamin K in turn may be eluted from the adsorbent by using five 250 c. c. portions of ether containing about 5 per cent methanol. The solvent free eluate contains one-half or less of the original inactive solids and is of increased vitamin K potency per mg. Several fold enrichments may be obtained by this or like methods.

From the above it will be apparent (1) that the silicates may be used to remove vegetable pigments from vitamin K extracts without removing vitamin K activity; (2) that the silicates may be used to remove phytosterols, etc. from vitamin K extracts without removing vitamin K activity, and (3) that the silicates may be used to adsorb vitamin K from vitamin K concentrates. From the above it will also be apparent (4) that vitamin K adsorbed by a silicate adsorbent may be eluted therefrom by treatment with an organic solvent. These properties which make the silicates satisfactory for use in the present invention, are essential for an improved commercial process in which vitamin K concentrates are obtained from natural sources.

In the specification and claims the term "silicate" is intended to include silica compounds such as silica gel as well as clay silicates such as fuller's earth. The preferred adsorbents are magnesium trisilicate, acidic fuller's earth and powdered silica gel.

It will be understood that the present invention is not limited to the above illustrative examples. All modifications coming within the scope and spirit of the present invention are intended to be covered by the following claims.

We claim:

1. The steps in the process of preparing improved vitamin K concentrates which comprises treating vegetable material having vitamin K activity with a stable organic solvent so as to form a dilute vitamin K extract containing vegetable pigments and sterols, adding to the extract thus obtained a silicate adsorbent, stirring the mixture thus formed until substantially all of the pigments have been removed from the extract, subjecting the extract to further silicate adsorbent treatment in order to remove substantial amounts of sterols, subjecting the resulting extract to further silicate treatment to adsorb the vitamin K activity, and then recovering the purified vitamin K activity therefrom by an elution treatment with an organic solvent and separating said solvent from said vitamin activity.

2. In a process of preparing vitamin K concentrates the steps which comprise treating vegetable material having vitamin K activity with a stable hydrocarbon solvent so as to form a dilute vitamin K extract containing vegetable pigments and sterols, adding to the extract thus obtained sufficient magnesium trisilicate to remove substantially all of the pigments from the extract, separating the extract from the adsorbent, and separating the solvent from said extract.

3. In a process of preparing vitamin K concentrates the steps which comprise treating vegetable material having vitamin K activity with a stable hydrocarbon solvent so as to form a dilute vitamin K extract containing vegetable pigments and sterols, adding to the extract thus obtained sufficient acidic fuller's earth to remove substantially all of the pigments from the extract, separating the extract from the adsorbent, and separating the solvent from said extract.

4. In a process of preparing vitamin K concentrates the steps which comprise treating vegetable material having vitamin K activity with a stable hydrocarbon solvent so as to form a dilute vitamin K extract containing vegetable pigments and sterols, adding to the extract thus obtained sufficient powdered silica gel to remove substantially all of the pigments from the extract, separating the extract from the adsorbent, and separating the solvent from said extract.

5. The process of preparing vitamin K concentrates which comprises treating ground dry alfalfa with hexane so as to form a dilute vitamin K extract containing pigments and sterols, adding to the extract thus obtained a small amount of magnesium trisilicate, stirring the mixture thus formed until substantially all of the pigments have been adsorbed by the trisilicate, separating the extract from the insoluble material, and removing the hexane from the extract by distillation in vacuo.

6. The process of claim 3, in which the extract is re-dissolved in acetone and cooled to about 0° C. in order to precipitate sterols.

7. The process for obtaining an improved vitamin K concentrate which comprises treating a virtually sterol-free vitamin K concentrate with fuller's earth so as to adsorb the vitamin K activity contained therein, and then recovering the purified vitamin K activity therefrom by an elution treatment with an organic solvent and separating said solvent from said vitamin activity.

BYRON RIEGEL.
PERRIN G. SMITH.
CARL E. SCHWEITZER.
VERNON C. FREE.